INVENTORS.
Etienne Cayphas
Robert Leclercq
Albert Van Cauter

BY Spencer & Kaye

ATTORNEYS 3,740,205
METHOD AND APPARATUS FOR BENDING A GLASS RIBBON TO A DIFFERENT DRAW DIRECTION
Etienne Cayphas, Lessines, Robert Leclercq, Auvelais, and Albert Van Cauter, Charleroi, Belgium, assignors to Glaverbel S.A., Watermael-Boitsfort, Belgium
Filed Apr. 13, 1971, Ser. No. 133,592
Claims priority, application Luxembourg, Apr. 17, 1970, 60,747
Int. Cl. C03b 15/18
U.S. Cl. 65—25 A                                                    19 Claims

ABSTRACT OF THE DISCLOSURE

A method and apparatus for bending a glass ribbon in the plastic state by forming a gas cushion in the region where the glass is to be bent and adjacent the concave surface of the bent ribbon portion, the gas cushion creating a bearing force which cooperates with the tensile forces on the ends of the ribbon to produce the desired bent configuration and which maintains the bent portion of the ribbon out of contact with any solid body.

BACKGROUND OF THE INVENTION

This invention relates to the bending and unbending of a ribbon of glass in the plastic state progressively along its length during longitudinal movement of the ribbon.

A progressive bending and unbending of a ribbon of glass in the plastic state occurs for example in the drawing of sheet glass by the Colburn process wherein a ribbon of glass is drawn vertically upward and then bent through an angle of about 90° about a so-called bending roller preparatory to movement into a horizontal annealing lehr.

When an advancing glass ribbon is bent against a bending roller in the known manner, the bending roller creates certain flaws, after a period of time in the ribbon surface which contacts it, at least unless the roller surface is periodically reconditioned in some way.

SUMMARY OF THE INVENTION

It is a primary object of the present invention to eliminate this cause of flaws.

The specific object of the invention is to achieve the bending of a travelling glass ribbon necessary for effecting a change of its direction, in a way which involves less risk of impairing the surface quality of the ribbon.

The objects of the present invention are achieved by a method of causing a ribbon of glass which is in continuous movement parallel with its longitudinal axis to change direction at one region along its path. According to this method, the glass is bent so as to follow a curved path at that region, against reaction forces which at least over a major part of the ribbon width are exerted by at least one gas cushion extending between positions which are spaced along the ribbon path, such cushion being maintained by blowing gas against the glass at each of those positions over the entire or substantially the entire width of the ribbon, i.e. the dimension measured normally to the ribbon path, while maintaining zones of lower pressure beneath the ribbon at regions which are located upstream and downstream of the cushion along the path, and allowing surplus gas blown at the positions to flow freely in the upstream and downstream directions away from the cushion to the lower pressure zones.

The invention affords the important advantage that the ribbon can be kept free from contact with any solid body surface over the whole or at least over a major part of the ribbon width, depending on the corresponding dimension of the gas cushion. Moreover, the path of the ribbon in the bending region can be maintained at a predetermined constant curvature. This is partly due to the fact that the unpredictable back pressures are avoided by allowing for free escape flow of surplus gas within the boundaries of the width of the ribbon path, and in part due to the fact that any tendency for the ribbon to move in such a way as to reduce the cross section of the escape paths of the gas upstream and downstream of the cushion is automatically counteracted by the resulting automatic increase in cushion pressure.

It also appears that if a ribbon is uniformly supported over a given area in the bending region by a gas cushion maintained by feeding gas under that ribbon area from the upstream and downstream ends thereof, the required supporting pressure can be maintained while keeping the energy of the gas streams where they initially impinge against the glass sufficiently low to avoid impressions in the glass due to the mechanical action of such gas streams. In addition, the described distribution of the gas flow is advantageous in lessening the risk of impairment of the glass by thermal effects in the event that the temperature of the gas streams feeding the cushion differs from that of the contacting surface of the glass ribbon.

The ribbon can be supported over its full width at the bending region by the gas cushion or cushions. However, when manufacturing sheet glass by drawing, the marginal portions of the ribbon are frequently dimensionally imperfect and are removed for use as cullet. In those circumstances, it is not of importance if defects are introduced into the margins of the ribbon at the bending region of the ribbon path. Accordingly, in certain embodiments of the invention which are of special interest in the manufacture of sheet glass by drawing, the margins of the ribbon are supported by mechanical members in the bending region of the ribbon path, the intervening central, and major, portion of the width of the ribbon being supported in that region by at least one gas cushion maintained as above defined.

The gas cushion or cushions are preferably entirely or substantially entirely maintained by the feed of gas into the area covered by the cushion from the upstream and downstream boundaries of such area. There is then virtually no risk of the ribbon being locally distorted by "blow out" such as is liable to occur if discharge of gas beneath the ribbon takes place from a position or positions such that there is no direct escape path for such gas away from the cushion, or at least no such direct escape path within the width of the ribbon path.

If a gas cushion is maintained not only by feeding gas into the area covered by the cushion along the upstream and downstream boundaries of such area, but also to a substantial extent by feeding gas into that area at a position intermediate those boundaries, the gas which discharges at the intermediate position encounters the opposed gas streams flowing from the upstream and downstream cushion boundaries and has no path of escape from the cushion within the limits of the width of the ribbon path. In those circumstances "blow out" of the ribbon is liable to occur. It is to be understood, however, that the feed of a minor proportion of gas into the cushion at one or more positions within the area covered by the cushion, to achieve some supplementary effect, is not excluded from the scope of the invention. In fact it has been found that by feeding a supplementary stream or supplementary streams of gas into a gas cushion, at a position or positions between the upstream and downstream boundaries of the cushion area, the stability of the cushion can be improved. No specific percentage figure can be given for the minor portions of gas which may be fed into the area covered by the cushion because the acceptable values will vary widely depending on the size of the ribbon, the radius of curvature imparted by the bending operation, the rate of glass drawing, the weight of the ribbon, etc. However, knowing that only a minor proportion is to be fed in, one skilled in the art could easily determine, by a simple and rapid trial and error procedure, the most suitable value of this minor proportion.

Advantageously, at least some of the gas which enters the cushion space along its upstream and downstream boundaries is discharged into that space in a direction which is substantially inclined towards such space. By virtue of such an inclined feed of the gas the required ribbon-supporting pressure in the cushsion can be maintained with gas feed currents of lower kinetic energy. This is important not only on account of the energy saving, but also because there is still less risk of the glass being impaired by the gas by mechanical and/or thermal effects. There is also the advantage that the escape currents of gas from the cushion or cushions are smaller so that they are less liable to disturb the environmental conditions to which the ribbon is exposed. This is of special importance when the gas escapes into a chamber which has to be maintained at a higher temperature, e.g., into a drawing chamber in which the glass ribbon is drawn from a bath of molten glass and in which the pattern and temperature of the gas currents, particularly those moving along the ribbon above or in the region of the drawing meniscus, have a substantial influence on the quality of the glass.

It is to be understood that the gas discharged at spaced positions along the ribbon path for maintaining a gas cushion beneath the ribbon over an area between those positions can, and usually will, provide some gas cushion support for the ribbon also at zones located upstream and downstream of such cushion. Whether or not, and to what extent, that additional support occurs will in any given situation depend on a number of factors, influencing the flow of gas to those zones, and particularly on the geometry of the apparatus used. This means that the gas cushion or cushions referred to herein as being maintained by discharging gas at upstream and downstream boundaries of the cushion may be integral with a cushion of gas at one or each of the zones situated upstream and downstream of such cushion.

Advantageously, the ribbon is supported in the bending region at least in part by a gas cushion maintained by blowing gas beneath the ribbon over, or substantially over, its full width, from positions spaced along the ribbon path, the gas being blown to establish a pressure which is higher along at least a portion of the ribbon path at one of the upstream and downstream boundaries of such cushion than along the corresponding portion of the ribbon path at the other of those boundaries so as to establish in the gas cushion a pressure differential or pressure gradient. Such a pressure gradient has been found to promote the stability of the gas cushion or gas cushions. Such a pressure gradient can also be used to promote movement of the ribbon along a curve of constant radius at the bending region. This is of importance when the margins of the ribbon are to be suppórted in the bending region by mechanical members because such members can then have supporting surfaces of circular or semicircular profile. Such members can for example be in the form of rollers mounted to be rotated by the travelling glass ribbon.

The ribbon may be carried or drawn upwardly toward the bending region and travel from that region in a horizontal dierction or at an acute angle to the horizontal, as already referred to. The invention is, however, not confined to that orientation of the ribbon path with respect to the bending region. The invention is equally applicable to the deflection of a travelling ribbon from and/or to some other direction or directions, as will be described in greater detail below.

In any case, however, the tensile forces on the ribbon may vary appreciably between successive portions of the length of the ribbon at the bending region. For example, when bending an upwardly drawn ribbon through substantially 90° preparatory to conveying the ribbon into an annealing lehr, the tensile forces on the ribbon are higher at the entry to the bending region than at the exit thereof, due to the weight of the vertically drawn glass. By maintaining a pressure differential in the gas cushion or cushions, as hereinbefore referred to variations in the tenisle forces along the ribbon at the bending region can be compensated for so as to keep the glass supported on the gas cushion or gas cushions in dynamic equilibrium at a predetermined constant curvature. In the case where the glass is drawn upwardly and bent through about 90° at the bending zone, the pressure in the or each gas cushion should be lower near the upstream boundary, i.e. adjacent the vertical ribbon portion, than near the downstream boundary thereof, i.e. adjacent the horizontal ribbon portion, thereby causing a flow of gas in the cushion space in a direction contrary to the direction of movement of the ribbon.

A pressure gradient in the gas cushion may be maintained either by blowing gas at respectively different rates at the opposed boundaries of the cushion and/or by blowing the gas so that the gas streams entering the cushion space at the different boundaries are differently oriented with respect to planes normal and transverse to the ribbon at those boundaries. For a given gas feed pressure the pressure in the gas cushion adjacent a particular boundary thereof tends to be higher as the angle at which the gas is blown towards the cushion space increases with respect to a plane normal and transverse to the ribbon at that boundary.

Advantageously, the escape of gas laterally from the or each gas cushion beneath at least one lateral edge of the ribbon is prevented or restricted. This step has the advantageous effect of reducing the kinetic gas energy required for supporting the ribbon in the bending region. Lateral escape of gas can be prevented or restricted by a flow barrier in contact with the edges or margins of the ribbon.

It is beneficial to feed gas against the ribbon from a position or positions located at the lateral edges, or at one of the lateral edges, of the or each gas cushion space so as to prevent or reduce lateral escape, at that position or positions, of gas which is fed into the said space at its upstream and downstream boundaries. The feed of gas at such lateral position or positions makes it easier to ensure that no contact between the ribbon and a mechanical part or parts occurs at the lateral edges of a region where the ribbon should be supported entirely by the gas cushion or cushions.

The maintenance of a supporting gas cushion requires the presence of a pressure-reaction support for such cushion. Such a support will preferably follow a generally curved profile parallel, or substantially parallel, to the curved path of the ribbon at the bending region.

Such cushion support may be fixed. Preferably, however, the support is provided by a member which is free to turn about an axis under the influence of resultant turning moments produced by reaction forces resulting from the establishment of the gas cushion or cushions. This is a very advantageous feature because as the gas cushion or cushions are established, the support automatically turns relative to the ribbon under any unbalanced turning moment until the support reaches a position in which it is in equilibrium. A considerable amount of time which would otherwise be expended in establishing by trial and error the optimum locations of the gas discharge positions along the ribbon path is thereby saved.

The invention includes apparatus for use in carrying out the method described above.

Such apparatus for causing a ribbon of glass which is in continuous movement parallel with its longitudinal axis to change direction at least at one region along its path, is composed of means providing a pressure reaction support for at least one gas cushion, means defining gas discharge orifices located at opposite boundaries of an area of the support so that when the ribbon is conducted parallel to its longitudinal axis, close to the support, in a direction such that successive portions along the length of the ribbon successively cross such boundaries, gas discharging from such orifices will impinge against such ribbon at spaced positions along the ribbon path and substantially over the full transverse dimension of the area of the ribbon which coincides with said support area, means for conducting gas under pressure to the orifices for maintaining a cushion of gas over the area of the support, between such support and the ribbon, and means for defining, with the ribbon, escape paths along which gas can escape by flowing in the upstream and downstream directions from the cushion.

The discharge orifice or orifices at each of the opposed area boundaries may be formed of a single slot or a series of local apertures distributed along such boundary. A gas flow barrier may be provided at one or each of the ends of the area of the gas cushion support for preventing or restricting lateral flow of gas from the area.

Apparatus according to the invention enables a travelling glass ribbon in the plastic state to be continuously and progressively bent and unbent with high reliability without the ribbon, or without at least a central portion of the ribbon, coming into contact with any solid member at the bending region of the ribbon path.

Advantageously, the apparatus includes, at least at one of the regions located immediately upstream and downstream with respect to the cushion area, means providing a guide surface for defining, with the ribbon path, a layer space along which gas can discharge from the cushion area in the upstream or downstream direction of the ribbon path.

Preferably, the surface of the support in the cushion area is recessed with respect to a guide surface disposed upstream and/or downstream of the area as defined above. Such disposition of the support surface in the cushion area further reduces the risk of contact between the ribbon and such surface. The ribbon path does not follow the profile of the support along the bending region but assumes a curvature with a constant or varying radius such that the forces exerted on the ribbon by the gas cushion are in equilibrium with the tensile forces on the ribbon.

In certain embodiments of apparatus according to the invention, there are two cushion support areas with gas discharge orifices at opposed boundaries thereof and an escape path is provided in a space intervening between those areas for evacuating gas which flows away from those cushion support areas into the intervening space. This arrangement is conducive to ensuring a particularly accurate positioning of the ribbon in the bending region. Moreover, by independently determining the temperatures of the gas streams discharging at the four different positions along the path of the ribbon over the bending region, thermal effects on the ribbon, which may vary along such region, can be more flexibly controlled.

Preferably there is provided, at least at one of the upstream and downstream boundaries of the gas cushion support area or areas, a slot-like discharge passage which is inclined toward such area. This feature is favorable in that it promotes economy in energy consumption as previously explained.

Advantageously, the gas cushion support area, or at least one of them if there is more than one, is surrounded by orifices through which gas can be discharged. A gas cushion with a substantially uniform pressure over its entire area can then be more easily maintained. For example, such gas cushion support area may be a substantially rectangular area bounded on each side by a gas discharge orifice or by a row of such orifices.

Preferably, the means for conducting gas to the upstream and downstream boundary orifices of the gas cushion support area, or at least one of such areas if there is more than one, are associated with means for maintaining gas streams of different flow rates through the opposed orifices so that a pressure differential can be maintained in the gas cushion with the attendant advantages referred to above in connection with the method according to the invention.

DESCRIPTION OF THE PREFERRED EMBODIMENTS

Figure 1:
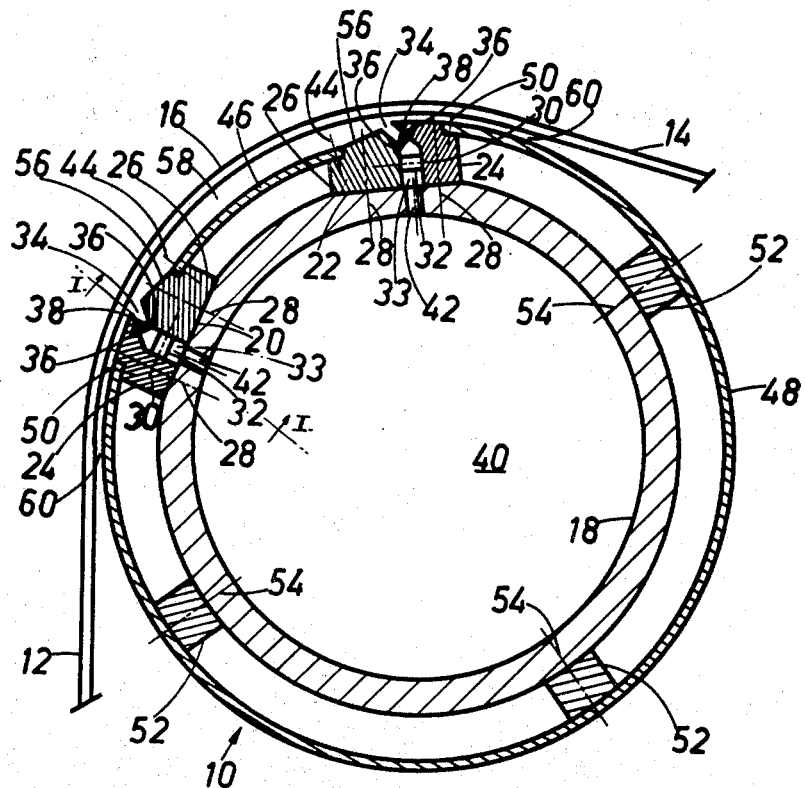
FIG. 1 is a cross-sectional end view of an apparatus according to the invention in the course of deflecting a ribbon of glass.

FIG. 1 shows a bending roller 10 around which is bent a glass ribbon 12 drawn vertically upward from a glass drawing tank, to have the curvature 16, into the substantially horizontal inclination 14 preparatory to entry into an annealing lehr. The glass drawing tank and annealing lehr are not shown; they can be of a type known per se.

The roller 10, which extends across the full width of the path of the glass ribbon, is composed of a thick inner tube 18 whose outer surface is essentially cylindrical but includes two flat surface portions 20 and 22 which are normal to respective planes subtending an angle of 60° between themselves and intersecting at the axis of the tube. Each of the surface portions 20 and 22 supports a pair of lip members 24 and 26 which are spaced apart to define a slot 33, 34 and which are secured to the tube 18 by screws located at the positions indicated by lines 28. The lip members and slots extend the full length of the roller. The lip members of each pair are also connected together by transverse screws located at the positions indicated by lines 30. These transverse screws extend through tubular pieces 32 located in the inner portions 33 of the slot between the lip members (see FIG. 1a).

The lip members are shaped so that the outer portions 34 of the two slots associated with the two surface portions 20 and 22 are mutually inclined to one another so that their median planes meet each other at an angle of 45°. The lip members of each pair have grooves 36 in their surfaces which face the slot 34 and these grooves serve to position porous metal strips 38 which function, inter alia, to produce a pressure drop in the gaseous medium forced between the lip members, as will hereafter be described. As an alternative to such porous metal strips, glass fibers could be used. The tube 18 has a series of perforations 42 distributed along its length in line with each of the slots 33, 34 so that such slots are in communication with the space 40 within the tube.

A curved metal plate 46 substantially coaxial with the tube 18 is attached to the inner lip members 26 by screws located at the positions indicated by lines 44, so that the plate is in spaced relation to tube 18. The remaining major portion of the tube 18, i.e., the portion which is not covered by the lip members and the bridging metal plate 46, is enveloped by a metal plate 48 the end portions of which are secured to the outer lips 24 by screws located at the positions indicated by lines 50. The plate 48 is also secured to the tube 18 at intervals along the length of the plate, that is around the tube periphery, by spacing battens 52 and screws located as indicated by the lines 54. The heads of the screws by which the plates 46 and 48 are secured in place are countersunk so as not to project above the outer surfaces of such plates.

It will be observed that the end portions of the plate 48 are received in rabbet grooves in the outer lips 24 so that the outer surface of that plate is flush with the top surface of such outer lips. The end portions of plate 46, which has less of a curvature than the plate 48, are received in rabbet grooves in inner lips 26 so that the ends of such plate are flush with the lower ends of the top inclined surfaces 56 of such inner lips.

Figure 1A:
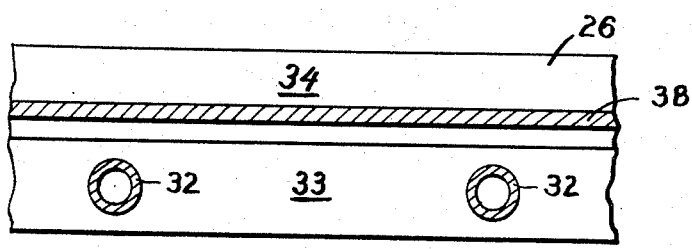
FIG. 1a is a cross-sectional detail view along the line I—I of the apparatus represented in FIG. 1.

In the cross-sectional view of FIG. 1a one can see with more detail the tubular pieces 32 which are located in the part 33 of the slot existing between the lips 24 and 26. These pieces 32 maintain the right space between said lips. In the part 34 of the slot there is located the porous metal strip 38. This strip is made of sintered stainless steel, and has a porosity of 40%. The maximum dimension of the pores must not exceed 150 m. Such kind of porous strip is old under the name SIPERM R 4/7 by the firm "S.A. Acier Marathon" in Belgium.

When the glass drawing plant is put into operation, the glass ribbon can initially be bent about the roller 10 in contact therewith so that the glass ribbon rotates the roller as the ribbon is pulled by entraining rollers into the horizontal annealing lehr. The interior space 40 is then connected to a source of air under pressure to cause a continuous discharge of air through the slots 33, 34. When the rotating roller reaches a position in which the arc bounded by those slots is substantially symmetrical with respect to the arc of curvature of the section of the glass ribbon between the flat portions 12 and 14 thereof, the roller stops rotating. The pressure of the air supply is adjusted so that the air forced through the slots 33, 34 maintains, in the space 58 beneath the curved section of the glass ribbon, an air cushion which remains in equilibrium with the forces due to the weight of the glass ribbon and the entraining forces thereon and thereby maintains the curved section 16 of the ribbon path at a substantially constant curvature and out of contact with the roller. Air continuously escapes from the space 58 beneath the side margins of the ribbon and is continuously replaced by further air issuing from the slots 33, 34. Some of the air discharged from the slots escapes outwardly from the cushion along escape paths 60, over the outer lip members 24. There is thus an air escape path to atmosphere extending over the full width of the ribbon path at each end of the cushion.

The air supplied to the interior space 40 of the tube 18 is preheated, e.g., to a temperature equal or close to that of the glass ribbon, so as to prevent any deleterious thermal effects on the glass and to prevent the incidence of currents of excessively cold air in the glass drawing chamber containing the bending roller.

Preferably, the blown air is recycled, i.e., taken from the drawing chamber itself. By way of example, air taken from the drawing chamber may be pressurized by a fan, reheated to the required temperature in a heat-exchanger and then fed to the bending roller. Preferably the air circuit is heat-insulated. All necessary ancillary equipment which is not shown in the drawing can be of a kind known per se and requires no detailed description.

Cooling air can, if necessary, be supplied, by means known per se, into the annular spaces between the tube 18, on the one hand, and plates 46 and 48, on the other hand, in order to cool the bending roller and thereby avoid impairment of its structure and maintain its shape and dimensions. Such cooling air can act, through heat transfer to the air cushion and the gas discharged through slots 33, 34, to exert a cooling action on the surface of the glass ribbon facing the bending roller in the same way that a glass ribbon can be cooled in a conventional plant by bending the glass in contact with an air-cooled bending roller. If required, any such cooling action on the glass due indirectly to the supply of cooling gas to the annular spaces beneath plates 46 and 48 can be avoided, reduced or increased by convection by appropriate selection of the temperature of the gas blown through slots 33, 34.

In a particular operative apparatus for bending glass in the manner described with reference to FIG. 1, the roller 10 is of rust-resistant 18/8 chrome-nickel steel, and has a diameter of 300 mm. and a length of approximately 3 meters. The slots 34 are 30 mm. in width and are located at the ends of an arc subtending 60° about the axis of the tube 18, this arc thus constituting a major part of the curved path 16 followed by ribbon 12, the slots 34 being upwardly convergent as shown so that their median planes intersect at an angle of 45°.

To properly support a glass ribbon 12 having a width of 3 meters and a thickness of 4 mm., air is delivered from chamber 40, through the slots 34, at a rate of 800 m.$^3$ per hour (calculated at 0° C. and atmospheric pressure), the air being preheated to 700° C. and supplied to the interior of tube 18 at a pressure of 500 mm. of water.

Figure 2:
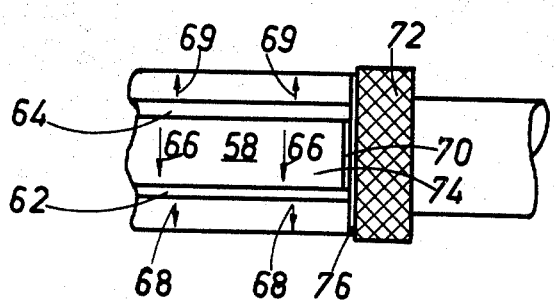
FIG. 2 is a detail longitudinal elevational view of part of a modified form of apparatus according to the invention.

An alternative form of roller is shown in FIG. 2 and may be used in a glass drawing plant in the same way as the roller shown in FIG. 1. This modified structure includes discharge slots 62 and 64 which are angularly spaced about the roller periphery similarly to the air discharge slots 34 of FIG. 1. There is the difference, however, that slot 62, over which the glass ribbon first passes, extends along a radius of the roller and is narrower than the slot 64, which is upwardly inclined, contrary to the direction of travel of the glass ribbon, in the same way as the corresponding slot of FIG. 1.

In operation, the air output through the narrower slot is, for example, equal to one-half of the air output through the wider slot. The approximate division of the air flow between the two slots, determined by preliminary calculation, can be adjusted in dependence on empirical measurement of the discharges actually occurring, if necessary with the apparatus operated cold and in the absence of a glass ribbon. The ratio between the outputs is influenced by the relative sizes of the perforations described with reference to FIG. 1. This ratio can be made quickly adjustable by providing a strip (not shown) which partly closes the perforations leading into slot 64 by an amount which can be quickly adjusted.

Due to the fact that slot 64 is inclined towards the air cushion and the air output through that slot is greater than the air output through slot 62, the pressure in the air cushion is higher in the vicinity of slot 64 than adjacent the slot 62 and there is a continuous flow of the cushioning air from the slot 64 towards the slot 62, as indicated by the arrows 66. Consequently, the proportion of air leaving slot 62 to form the escape currents 68 tends to be larger than the proportion of air leaving slot 64 to form the escape currents 69 so that the difference between these oppositely directed escape currents is less than the difference between the outputs of air through the slots 62 and 64.

The roller of FIG. 2 is moreover provided with an end slot 70 and an edge roller 72 at each end of the roller. Air is blown through the slots 70 simultaneously with the blowing of air through slots 62 and 64. The effect of this discharge of air through slots 70 and the provision of edge rollers 72 is to brake the discharge of air from the cushion at the lateral edges of the glass ribbon.

Each slot 70 is defined by a metal plate 74 and an end disc 76 so that the slot is directed in a plane and normal to the axis of the roller. As an alternative the end slots could be inclined upwardly and inwardly towards the cushion. The size of the end slots and the output of air therethrough are such as to prevent any substantial drop in pressure in the cushion over the zones near the lateral edges of the ribbon. The edge rollers 72, which may be of a type known per se, are freely rotatable on the bending roller and their peripheral surfaces are engraved, preferably to a depth of several millimeters.

When the apparatus is in use, the edge rollers are contacted and turned by the margins of the glass ribbon. The distance between the two edge rollers substantially corresponds to the normally utilizable central portion of the width of the glass ribbon. The diameter of the edge rollers exceeds the diameter of the intervening main portion of the bending roller by an amount such that the edge rollers support the margins of the ribbon substantially in the plane in which the central portion of the ribbon is supported by the air cushion.

Figure 3:
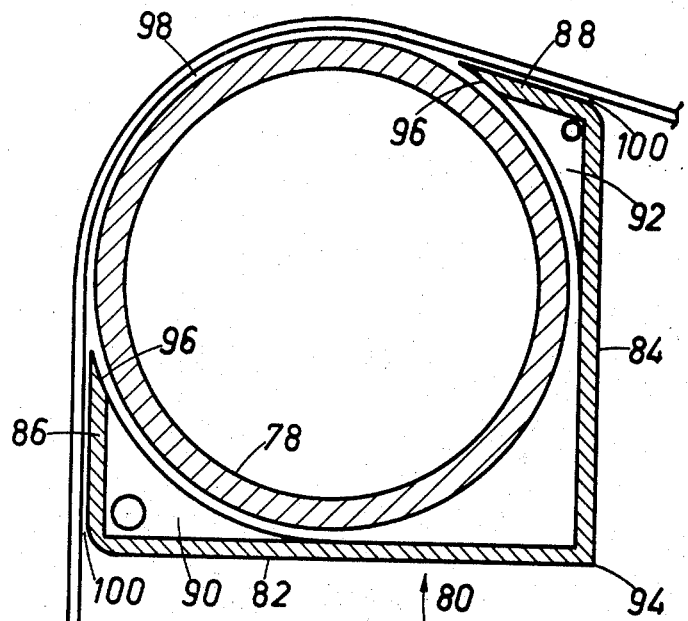
FIG. 3 is a view similar to that of FIG. 1 of another embodiment of the invention.

Reference is now made to the embodiment of the invention illustrated in FIG. 3. In this embodiment, there is an ordinary peripherally continuous roller 78 which is mounted in an air box 80 having bottom and rear walls 82 and 84, respectively, and two lips 86 and 88. The outer surface of lip 86 is disposed trangentially to the outer surface of roller 78 at the side thereof to which the glass ribbon is drawn, and the outer surface of lip 88 is disposed tangentially to the outer surface of roller 78 at the upper portion thereof which the glass leaves to travel toward the annealing lehr. The lips 86 and 88 are buttressed by internal apertured flanges 90 and 92, respectively. The free ends of the lips are tapered so that their edge faces are close, and parallel, to the outer surface of roller 78.

The outer surface of one or both lips 86 and 88 can in any given case be oriented and/or shaped so as to extend parallel to the adjacent path of the glass ribbon, whether the path be straight or curved.

The air box 80 can be moved axially onto the roller to be brought to the illustrated position. Alternatively, the box can be formed in two sections which are connected by a pivot or linkage at or adjacent the corner edge 94 so that the sections can be opened and then closed about the roller. Such a linkage may be constructed so as to permit adjustment of the distances between the lips 86 and 88, and the roller.

In operation, preheated pressurized air is fed into the box and discharges through the slots 96 formed between the lips 86 and 88, on the one hand, and the roller 78, on the other hand. This discharged air maintains a cushion of air under pressure in the space 98 and this air cushion opposes, and balances out, the forces due to the weight of the glass and the ribbon entraining forces so as to support the ribbon out of contact with the roller 78 and ensure that the ribbon follows a substantially constant cylindrically curved path about the roller. Some of the air discharging through the slots 96 continuously escapes to the atmosphere in opposite directions along the ribbon, along the escape paths 100, and keeps the ribbon out of contact with the outer surfaces of the lips.

Figure 4:
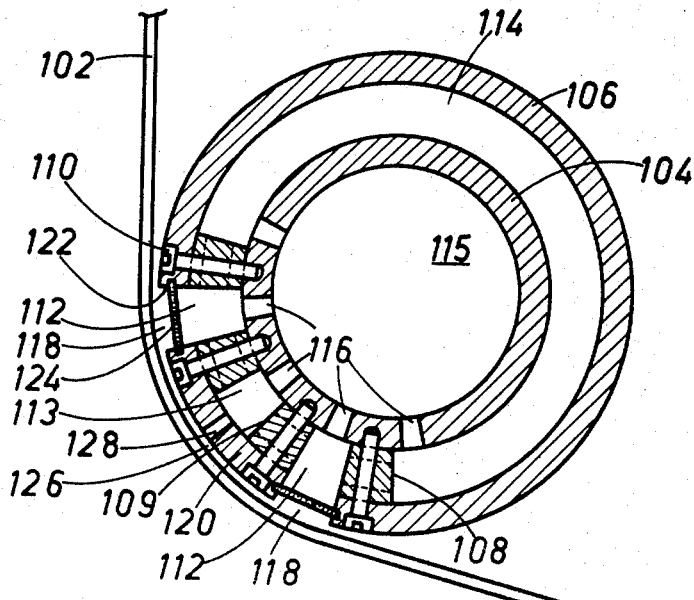
FIG. 4 is a view similar to that of FIG. 1 of a further embodiment of the invention.

FIG. 4 illustrates an embodiment of the invention in which a ribbon of glass 102 drawn downwardly from a known type of installation (not shown) is bent about an air cushion and continues along a path which is at an acute angle to the horizontal. The air cushion is formed on a bending roller composed of an inner tube 104 and a coaxial outer tube 106 supported by the inner tube 104 and a coaxial outer tube 106 supported by the inner tube by four spacing members 108 each having a passageway 109 extending transversely therethrough. The outer and inner tubes and the spacing members are connected by screws 110 whose heads are countersunk in the wall of the outer tube.

The spaces 112, 113 and 114 defined between the two tubes and the spacing members are in communication with the interior space 115 within the inner tube 104 via perforations 116 in such inner tube. The outer tube 106 is interrupted by two apertures or slots 118. Both the edge faces of the outer tube portion 120 located between these slots and the opposed edge faces forming the other side boundaries of the slots are formed with grooves 122 which hold porous metal strips 124.

In operation, preheated air is supplied under pressure to the space 115 within the inner tube and this air passes through perforations 116 into the spaces between the inner and outer tubes. Air continuously discharges through the porous metal strips 124 and through apertures 128 formed in the outer tube portion 120 located between the strips. The rate of discharge of air through the porous metal strips 124 is made sufficient for maintaining in the space 126 between the zones where such strips are located, an air cushion which balances the ribbon entraining forces and maintains the ribbon on a substantially unvarying path, out of contact with the roller.

Excess air discharged through the porous strips can escape to the atmosphere not only laterally, i.e., past the lateral edges of the glass ribbon, but also in opposed directions tangential to the roller away from the space 126 and over the full width of the ribbon. Some of the preheated air supplied to space 115 passes through central perforations 116 and through the apertures 128 into the central region of the air cushion space 126. The apertures 128 are, however, relatively small and the small amount of air discharging therethrough merely serves to enhance the stability of the air cushion formed principally by the discharge of air through the porous metal strips 124.

Figure 5:
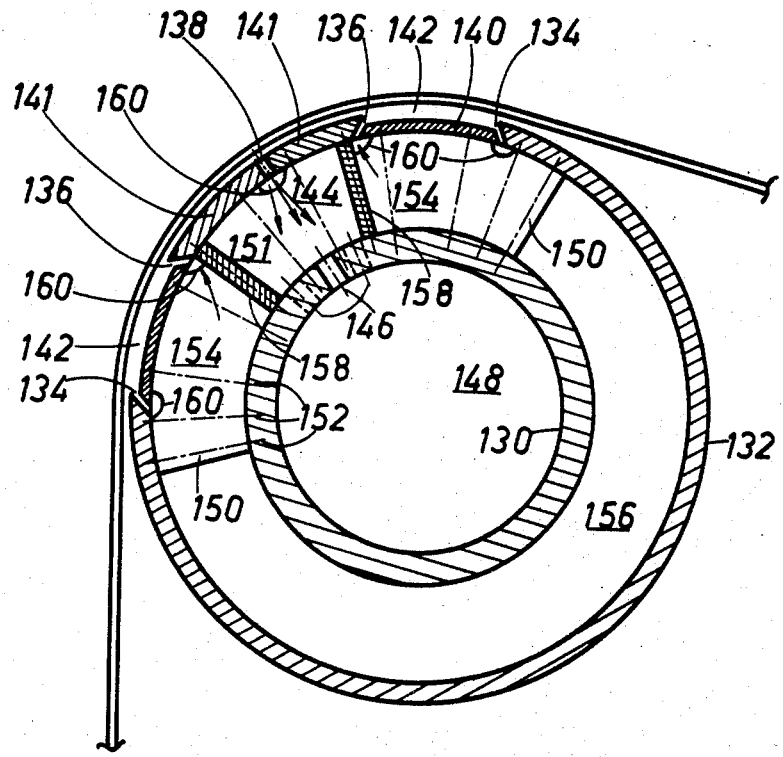
FIG. 5 is a view similar to that of FIG. 1 of still another embodiment of the invention.

FIG. 5 shows another embodiment of the invention in which a ribbon of glass is drawn upwardly from a bath of molten glass and is bent about a bending roller preparatory to following a substantially horizontal path through an annealing lehr. The bending roller includes an inner tube 130 and an outer tube 132. In the wall of the outer tube there are five slots, consisting of outer pairs of upwardly convergent slots 134 and 136 and a central slot 138 directed radially of the tube. The angle of convergence of the slots 134 and 136 of each pair is about 45°. These slots are formed between arcuate strips 140, forming portions of the outer tube wall, and the portions of the tube wall between which those strips are located. The portion of the tube wall located between the strips 140 is formed of two further strips 141 which are themselves spaced apart to define the slot 138.

It will be observed that the strips 140 are thinner than the other portions of the outer tube wall and the outer surfaces of such strips are set in with respect to the neighboring parts of the outer tube surface to provide spaces 142 in which cushions of air can be maintained.

The component parts of the outer tube are connected to the inner tube 130 by a series of webs 150 and 151, which are in planes normal to the axis of the tubes. The webs 150 and 151 which appear in FIG. 5 belong to respective series of such webs, the webs of each series being located at intervals around the tubes. The tubes are connected to those webs by screws located at the positions indicated by the lines 152.

An inner space 144 beneath the central slot 138 is separated from the laterally adjacent spaces 154 beneath the pairs of convergent slots 134 and 136 by partition walls 158.

In use, superheated air is supplied under pressure into the space 156 between the tubes. This air can reach the spaces 154 in communication with space 156 and discharges through the pairs of convergent slots 134 and 136 to maintain air cushions in the spaces 142 for supporting the glass ribbon out of contact with the roller. Some of the air discharged through these convergent slots continuously discharges laterally past the lateral edges of the glass ribbon. There is also a continuous discharge of air, to lower pressure regions, in the upstream and downstream directions of the ribbon path, away from each space 142. Thus, some excess air discharged through slots 134 escapes in the upstream and downstream directions across the full width of the ribbon path while some of the excess air discharged through slots 136 flows inwardly over the strips 141, across the full width of the ribbon path, and escapes through the central slot 138 into the space 144. From there this air flows via optional perforations 146 into the interior space 148 from which the hot air can be evacuated for reheating and recycling if required.

It will be understood that the above description of the present invention is susceptible to various modifications, changes and adaptations and the same are intended to be comprehended within the meaning and range of equivalents of the appended claims.

We claim:

1. A method of bending a ribbon of glass which is in a plastic state and which is in continuous movement along its longitudinal axis, to change the direction of its travel at one region along its path, where the glass is bent so as to follow a curved path at that region, comprising: blowing gas against substantially the entire width of the ribbon at at least two positions spaced apart along the ribbon path in that region by a distance which constitutes a major portion of said curved path, for maintaining a gas cushion which extends between those positions, which is produced at least in major part by the gas blowing from said two positions, which creates reaction forces against which the ribbon is bent, and which maintains the ribbon out of contact with any solid body in the region where it is bent; maintaining zones of pressure lower than that of the cushion beneath the ribbon at positions which are located upstream and downstream of said cushion along the said path; and causing surplus gas blown at the said positions to flow freely in the upstream and downstream directions away from said cushion to said lower pressure zones.

2. A method as defined in claim 1 wherein said step of causing is carried out by providing escape paths for the gas flowing in the upstream and downstream directions away from said cushion which escape paths extend across the major part of the width of the ribbon.

3. A method as defined in claim 1 further comprising the further step of supporting the lateral edge portions of the glass ribbon in the bending region by mechanical members.

4. A method as defined in claim 1, comprising the further step of discharging a supplementary stream of gas at a position within the area covered by the cushion for improving the stability of the cushion.

5. A method as defined in claim 1 wherein said step of blowing is carried out at two positions defining the upstream and downstream boundaries of the cushion and in a manner such that the gas is blown in a direction which is substantially inclined toward such cushion.

6. A method as defined in claim 5 wherein said step of blowing is carried out in a manner to establish a pressure which is higher adjacent one of such cushion boundaries than adjacent the other of those boundaries.

7. A method as defined in claim 1, comprising the further step of at least restricting the escape of gas from the cushion past a lateral edge of the ribbon in a direction normal to the longitudinal axis of the ribbon.

8. A method as defined in claim 7 wherein said step of restricting is carried out by blowing gas toward the ribbon along at least one lateral edge of the cushion.

9. A method as defined in claim 1 wherein said steps of blowing and maintaining include providing a pressure reaction support mounted for rotation about an axis under the influence of turning moments imposed by gas cushion pressures into a position in which the forces on the support are in equilibrium.

10. A method as defined in claim 1 for deflecting a continuously forming and advancing ribbon of glass in the course of manufacturing sheet glass.

11. Apparatus for causing a ribbon of glass in continuous movement parallel to its longitudinal axis to change direction at one region along its path where the glass is bent to follow a curved path at that region, comprising, in combination: pressure reaction support means for supporting a gas cushion means defining slot-like gas discharge orifices located at opposite boundaries of an area of said support means, which boundaries are spaced apart along said curved path by a distance which constitutes a major portion of said curved path, so that when the ribbon is conducted parallel with its longitudinal axis, close to said support means, in a direction such that successive portions along the length of the ribbon successively cross such boundaries, gas discharging from such orifices will impinge against such ribbon at spaced positions along the ribbon path and substantially over the full transverse dimension of the area of the ribbon which coincides with such area of said support means; means connected to said orifices for conducting thereto gas under pressure for maintaining a cushion of gas over such area of said support means, between said support means and the ribbon; and means defining, with the region to be occupied by the ribbon, escape paths along which gas can escape by flowing from said cushion in the upstream and downstream directions parallel to the longitudinal ribbon axis.

12. An arrangement as defined in claim 11, further comprising, at least at one of the regions located immediately upstream and downstream with respect to such area of said support means, means forming a guide surface defining, with the region to be occupied by the ribbon, a layer space along which gas discharges from such area of said support means in the direction of the ribbon path.

13. An arrangement as defined in claim 12 wherein said support means has a surface adjacent such area which is recessed with respect to said guide surface.

14. An arrangement as defined in claim 11 wherein said support means presents two gas cushion support areas and there are gas discharge orifices at opposed boundaries of each such area and said means defining escape paths provide an escape path in a space intervening between such areas for evacuating gas which flows away from such cushion support areas into such intervening space.

15. An arrangement as defined in claim 11 wherein said means defining slot-like gas discharge orifices include one such orifice which is disposed along one said opposite boundary of such area of said support means and which produces a gas flow inclined toward such area.

16. An arrangement as defined in claim 11 wherein said means defining gas discharge orifices include a plurality of orifices surrounding such area of said support means and through which gas can be discharged.

17. An arrangement as defined in claim 11 wherein said means defining gas discharge orifices are arranged for maintaining gas streams of different flow rates through the orifices at opposite boundaries of such areas of said support means.

18. An arrangement as defined in claim 11 wherein said support means have a substantially circular cross section and are mounted for free rotation about an axis under unbalanced turning moments exerted by gas cushion pressures.

19. An arrangement as defined in claim 11 wherein said boundaries are spaced apart by a distance which subtends an arc of 60° along said curved path.

References Cited

UNITED STATES PATENTS

| | | | |
|---|---|---|---|
| 3,476,539 | 11/1969 | McCown et al. | 65—196 X |
| 3,137,556 | 6/1964 | Badger et al. | 65—196 X |

ARTHUR D. KELLOGG, Primary Examiner

U.S. Cl. X.R.

65—94, 182 A, 196